United States Patent [19]

Nishikawa

[11] Patent Number: 5,434,841
[45] Date of Patent: Jul. 18, 1995

[54] PLURAL-BEAM OPTICAL HEAD

[75] Inventor: Koichiro Nishikawa, Tokyo, Japan

[73] Assignee: Canon Kabushiki Kaisha, Tokyo, Japan

[21] Appl. No.: 324,379

[22] Filed: Oct. 17, 1994

Related U.S. Application Data

[63] Continuation of Ser. No. 961,509, Oct. 15, 1992, abandoned.

[30] Foreign Application Priority Data

Oct. 22, 1991 [JP] Japan .................... 3-301242

[51] Int. Cl.⁶ .............................................. G11B 11/00
[52] U.S. Cl. ...................... 369/121; 369/109;
 369/110; 369/44.23; 369/44.24; 369/44.37;
 369/44.39; 359/438; 359/496; 359/678;
 359/837
[58] Field of Search ............... 369/121, 109, 110, 112;
 359/438, 496, 625, 678, 831, 833, 834, 835, 836,
 837

[56] References Cited

U.S. PATENT DOCUMENTS

| | | | |
|---|---|---|---|
| 4,547,872 | 10/1985 | Henmi et al. | 369/121 |
| 4,592,038 | 5/1986 | Kubota et al. | 369/121 |
| 4,607,359 | 8/1986 | Matsubayashi et al. | 369/121 |

FOREIGN PATENT DOCUMENTS

| | | |
|---|---|---|
| 0418087 | 3/1991 | European Pat. Off. . |
| 0468800 | 1/1992 | European Pat. Off. . |
| 0475765 | 3/1992 | European Pat. Off. . |

OTHER PUBLICATIONS

Patent Abstracts of Japan, Kokai No. 58-218033, vol. 8, No. 7, Apr. 4, 1984.
Patent Abstracts of Japan, Kokai No. 02-183452, vol. 14, No. 462, Oct. 5, 1990.
Patent Abstracts of Japan, Kokai No. 02-240849, vol. 14, No. 561, Dec. 13, 1990.
"Polarization Splitting Prism," IBM Technical Disclosure Bulletin, vol. 33, No. 1A, Jun. 1990, pp. 110 and 111.

*Primary Examiner*—Viet Q. Nguyen
*Attorney, Agent, or Firm*—Fitzpatrick, Cella, Harper & Scinto

[57] ABSTRACT

A plural beam optical head is constituted by an optical system for imaging a plurality of light beams onto an optical information recording medium, a double-refractive crystal prism and a sensor. The plurality of light beams obtained from the optical information recording medium are separated into components the polarized direction of which are orthogonal one another by the double-refractive crystal prism. The direction of arrangement of the plurality of light beams incident on the double-refractive crystal prism is substantially perpendicular to the direction of separation of the light beams obtained from the double-refractive crystal prism. The light beams from the double-refractive crystal prism are received by the sensor.

10 Claims, 4 Drawing Sheets

PLURAL-BEAM OPTICAL HEAD

This application is a continuation of application Ser. No. 07/961,509, filed Oct. 15, 1992, now abandoned.

BACKGROUND OF THE INVENTION

1. Field of the Invention

This invention relates to an optical head for use in an optical information recording-reproducing apparatus such as a magneto-optical disk apparatus, and particulary to a plural-beam optical head for imaging a plurality of light beams on an optical information recording medium. The optical head of the present invention can be applied as an optical head for effecting at least two of the erasing, recording and reproduction of information at a time.

2. Related Background Art

As an optical head for recording and reproducing a magneto-optical signal by the use of a double-refractive crystal prism, there is one as shown in FIG. 1 of the accompanying drawings. In this figure, a servo signal detection system is omitted. In FIG. 1, a light beam 50, which is emitted from a semiconductor laser 1 and collimated by a collimator lens 2, is transmitted through a beam splitter 3 with a beam shaping portion, and is imaged on a magneto-optical disk 5 by an objective lens 4, whereby the erasing, recording or reproduction of information is effected. The light beam 50 that is reflected by the magneto-optical disk 5 is again collimated by the objective lens 4 and is now reflected by the beam splitter 3 with a beam shaping portion, and is directed to a signal reproducing optical system. The signal reproducing optical system comprises a half wavelength plate 6, a double-refractive crystal prism 7, a condensing lens 8 and an RF sensor 9. The light beam reflected by the beam splitter 3 with a beam shaping portion has its direction of polarization rotated by about 45° by the half wavelength plate 6 and is directed to the double-refractive crystal prism 7. The double-refractive crystal prism 7 comprises prisms 7a and 7b whose crystal axes are orthogonal to each other (the crystal axis of the prism 7a being perpendicular to the plane of the drawing sheet of FIG. 1, and the crystal axis of the prism 7b being perpendicular to the incident light beam in the plane of the drawing sheet of FIG. 1), and the cemented surface thereof is perpendicular to the plane of the drawing sheet of FIG. 1 and forms approximately 45° with respect to the direction of incidence of the light beam, and separates the incident light beam into two light beams whose directions of polarization are orthogonal to each other, in the plane of the drawing sheet of FIG. 1. Where the prisms 7a and 7b each comprise rock crystal, the two light beams form an angle of about 1° therebetween. The light beam incident on the double-refractive crystal prism 7 is separated into two light beams 51 and 52 whose directions of polarization are orthogonal to each other, in the plane of the drawing sheet of FIG. 1. The separated two light beams 51 and 52 are Condensed on the RF sensor 9 by the condensing lens 8. The RF sensor 9 comprises at least two light receiving portions, and the output thereof makes a differential signal and thereby becomes a magneto-optical signal.

Now, it has heretofore been proposed to insert a diffraction grating into a system as shown in FIG. 1 in order to effect recording and reproduction at one time (for example, Japanese Laid-Open Patent Application No. 64-82384). FIG. 2 of the accompanying drawings shows a system having a diffraction grating inserted into the system of FIG. 1. A plurality of light beams 50, 60 and 70 are made by a diffraction grating 10. These light beams travel along substantially the same path as that previously described and each of them is separated by the double-refractive crystal prism 7 into light beams whose directions of polarization are orthogonal to each other (the light beam 50 is separated into light beams 51 and 52, the light beam 60 is separated into light beams 61 and 62, and the light beam 70 is separated into light beams 71 and 72), and these separated light beams are condensed on an RF sensor 12. When for example, the light beam making a relatively preceding spot on the magneto-optical disk 5 with respect to the direction of rotation thereof is designated as 50 and the light beam making a succeeding spot is designated as 60, recording is effected by a spot corresponding to the light beam 50 and at the same time, reproduction is effected by a spot corresponding to the light beam 60, and from the differential signal of the output from the RF sensor 12 which corresponds to the light beams 61 and 62, there is obtained a reproduction signal as a magneto-optical signal.

Now, in the example of the prior art as shown in FIG. 2, the direction of arrangement of the plurality of beams entering the double-refractive crystal prism and the direction of light beam separation by the double-refractive crystal prism coincide with each other (in FIG. 2, in the plane of the drawing sheet thereof) and therefore, as shown in FIG. 3 of the accompanying drawings which is a partial enlarged perspective view, a plurality of spots are arranged on substantially the same straight line on the RF sensor 12. Accordingly, to receive the plurality of spots without them interfering with one another, the condensing lens 8 must be set so that in FIG. 3, not only the spots corresponding to the light beams 51, 61 and 62 may not interfere with one another and further the spots corresponding to the light beams 52, 71 and 72 may not interfere with one another, but also the spots corresponding to the light beams 62 and 71 may not interfere with each other, and this has led to the problem that the optical system unavoidably becomes bulky. Such a circumstance also holds true when the plurality of beams are made by a plurality of lasers, a laser array or a double-refractive crystal. If the circumstance is restricted to a case where the plurality of beams are made by a diffraction grating, although in FIG. 2, there are shown 0-order diffracted light (corresponding to the light beam 50) and ±1st-order diffracted lights (corresponding to the light beams 60 and 70), diffracted lights of still higher orders also become non-negligible due to a slight manufacturing error or the like in the diffraction grating. This in turn has led to problem that the interference between spots on the RF sensor becomes unavoidable.

SUMMARY OF THE INVENTION

It is the object of the present invention to provide a plural-beam optical head which uses a double-refractive crystal in a signal reproducing optical system and which is free of interference on a sensor and can constitute a compact optical system.

According to the present invention, to achieve the above object, there is provided a plural-beam optical head having means for imaging a plurality of light beams on an optical information recording medium, directing the light beams passed through the optical information recording medium to a double-refractive crystal prism having the function of separating the light beams into components whose directions of polarization are orthogonal to each other, and reproducing recorded information on the optical information recording medium from the light beams obtained from the double-refractive crystal prism, characterized in that the direction of arrangement of the plurality of light beams entering the double-refractive crystal prism and the direction of separation of the light beams obtained from the double-refractive crystal prism are substantially orthogonal to each other.

In the plural-beam optical head of the present invention, the direction of arrangement of the plurality of light beams and the direction of separation of the light beams by the double-refractive crystal prism are substantially orthogonal to each other and therefore, it becomes easy to avoid interference on an RF sensor, and a compact optical system can be constructed.

DESCRIPTION OF THE PREFERRED EMBODIMENT

Figure 1:
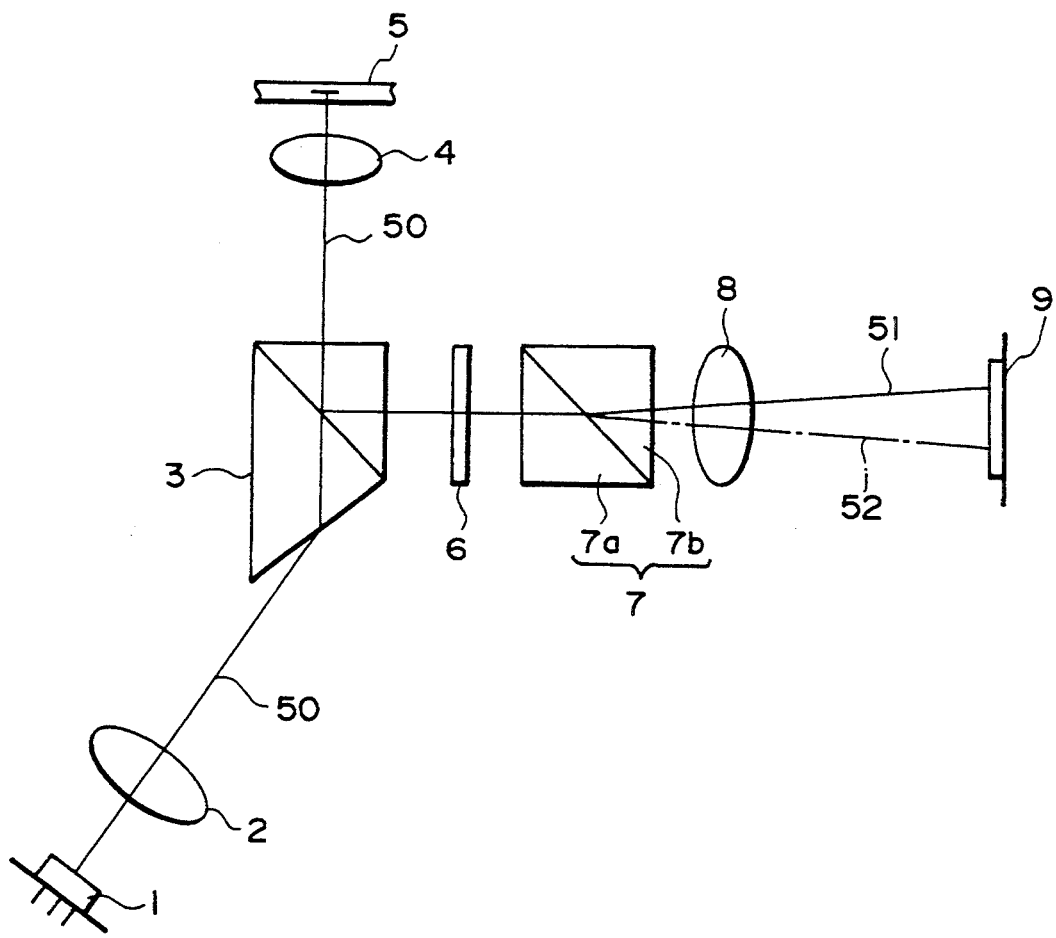
FIG. 1 shows an optical head according to the prior art.

An embodiment of the present invention will hereinafter be described with reference to the drawing.

Figure 2:
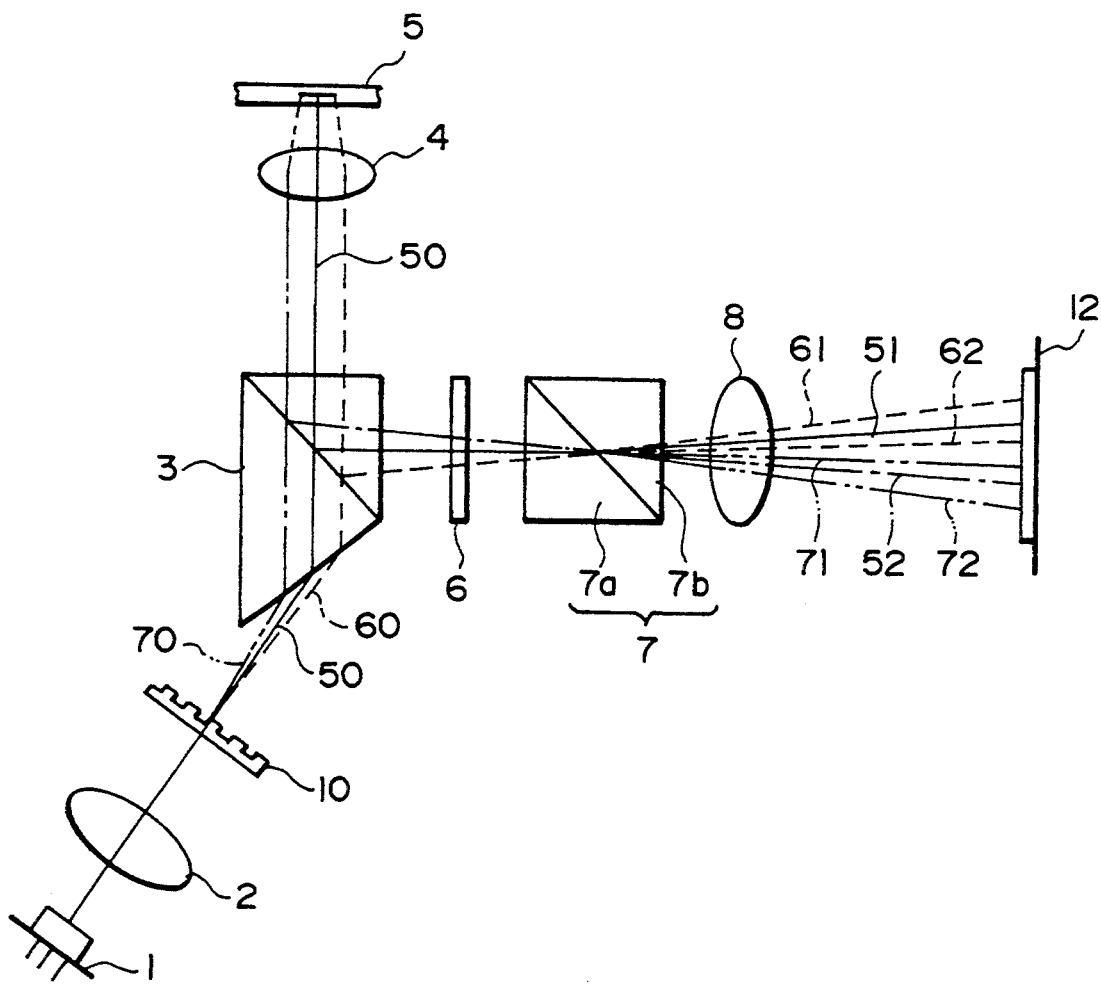
FIG. 2 shows an optical head according to the prior art.
Figure 3:
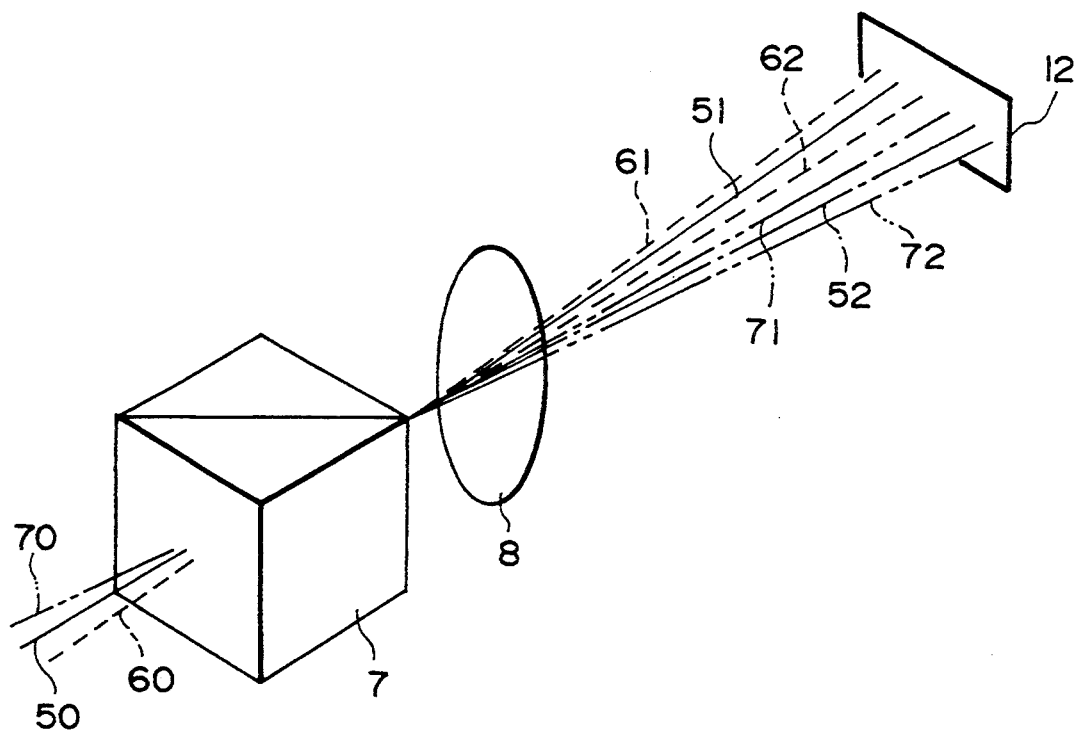
FIG. 3 is a perspective view showing portions of the signal reproducing optical system of the optical head according to the prior art.
Figure 4:
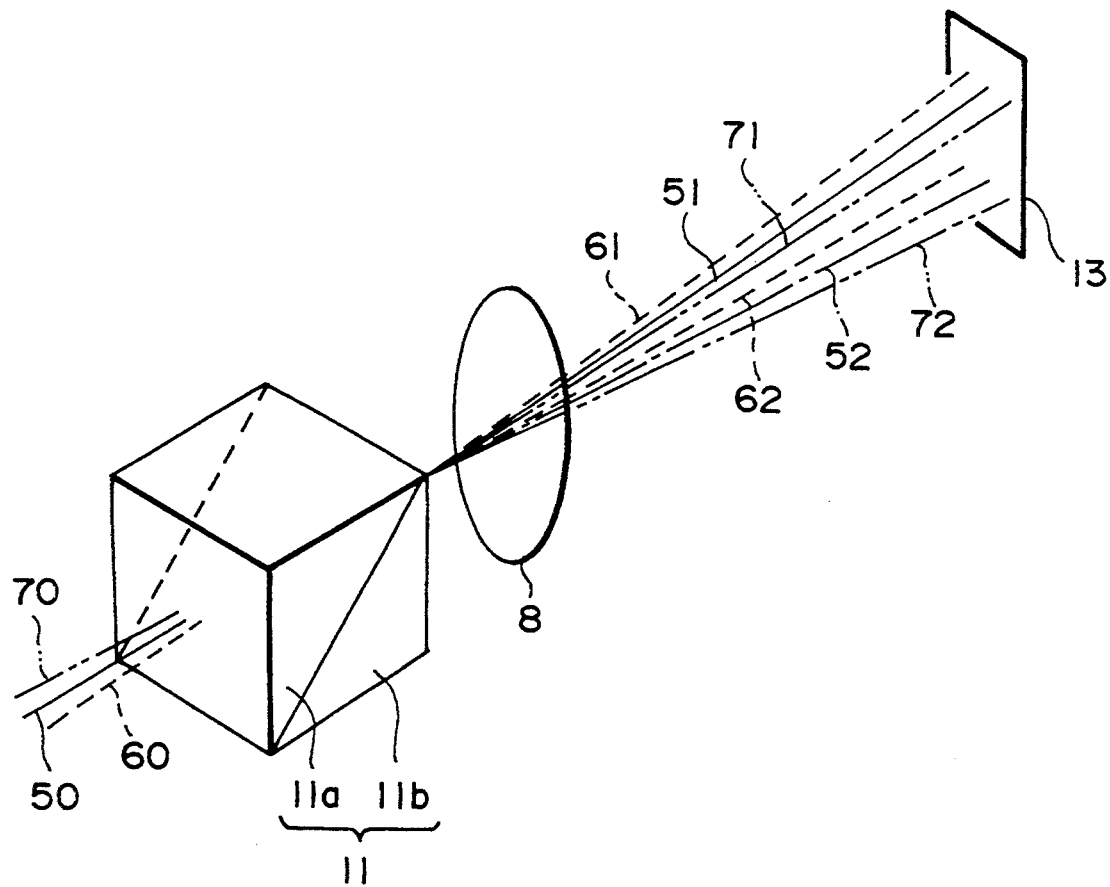
FIG. 4 is a perspective view showing portions of the signal reproducing optical system of the optical head of the present invention.

FIG. 4 shows portions of the signal reproducing optical system of the optical head of the present invention, and particularly shows the portions thereof similar to those shown in FIG. 3. The general construction of the optical head according to the present embodiment is similar to that of FIG. 2, but differs in only the portions of the signal reproducing optical system shown in FIG. 4 from the construction of FIG. 2.

In FIG. 4, light beams 50, 60 and 70 reflected by a magneto-optical disk, not shown, which is an optical information recording medium, enter a double-refractive crystal prism 11. The double-refractive crystal prism 11 comprises a rock crystal prism 11a having a crystal axis perpendicular to the direction of arrangement and the direction of incidence of the light beams 50, 60 and 70, and a rock crystal prism 11b having a crystal axis orthogonal to the crystal axis of the prism 11a, and the cemented surface thereof is parallel to the direction of arrangement of the light beams 50, 60 and 70, as shown in FIG. 4, and the normal thereto forms an approximately 45° angle with respect to the direction of incidence of the light beams. The light beams 50, 60 and 70 that have entered the double-refractive crystal prism 11 have their directions of polarization orthogonal to one another and each of them is separated into two light beams in a direction perpendicular to the direction of arrangement of the high beams 50, 60 and 70, and the divided light beams are condensed on an RF sensor 13 by a condensing lens 8. The RF sensor 13 is divided into three in the direction of arrangement of the light beams 50, 60 and 70 and divided into two in a direction perpendicular thereto, and receives light beams 51, 52, 61, 62, 71 and 72 independently of one another. The condensing lens 8 is set so that the light beams 51, 61 and 71 or the light beams 52, 62 and 72 may not interfere with one another.

In the present embodiment, as shown in FIG. 2, the plurality of beams are made by a diffraction grating and therefore, the presence of high-order diffracted lights is conceivable, but light beams corresponding thereto exist on both sides and outside in the direction of arrangement of the light beams 51, 61 and 71 and the light beams 52, 62 and 72 and therefore, interference therebetween can be avoided.

As described above, the plural-beam optical head of the present invention has means for imaging a plurality of light beams on an optical information recording medium, directing the light beams 50, 60 and 70 passed through said optical information recording medium to the double-refractive crystal prism 11 having the function of separating the light beams into components whose directions of polarization are orthogonal to each other, and reproducing the recorded information on said optical information recording medium from light beams 51, 61, 71, 52, 62 and 72 obtained from said double-refractive crystal prism 11, and the double-refractive crystal prism 11 is disposed so that the direction of arrangement of the plurality of light beams 50, 60 and 70 and the direction of separation of the light beams 51, 61, 71, 52, 62 and 72 obtained from the double-refractive crystal prism 11 may be substantially orthogonal to each other.

As described above, according to the present invention, the design is made such that the direction of arrangement of the plurality of light beams and the direction of separation of the light beams by the double-refractive crystal prism are substantially orthogonal to each other and therefore, it becomes easy to avoid the interference on the RF sensor and a compact optical system can be constructed.

What is claimed is:

1. A plural-beam optical head comprising:
    means for imaging a plurality of light beams on an optical information recording medium;
    a double-refractive crystal prism for separating a plurality of light beams coming from the optical information recording medium into components whose directions of polarization are orthogonal to each other;
    means for receiving the components of the light beams obtained from said double-refractive crystal prism; and
    means for converging the light beams obtained by said double-refractive crystal prism on said light receiving means as a plurality of light spots,
    wherein said double-refractive crystal prism is arranged such that the plurality of light spots on said light receiving means are arranged in a plurality of lines.

2. The plural-beam optical head according to claim 1, wherein said light receiving means reproduces recorded information from the optical information recording medium.

3. The plural-beam optical head according to claim 1, wherein said double-refractive crystal prism comprises a first triangular prism and a second triangular prism, and a virtual plane formed by the plurality of light beams incident on said double-refractive crystal prism forms an angle of substantially 45° with respect to a cemented surface formed between the first and second prisms and the normal of the cemented surface.

4. A plural-beam optical head comprising:
   means for guiding a plurality of light beams to an optical information recording medium;
   a double-refractive crystal prism for separating a plurality of light beams coming from the optical information recording medium into components whose directions of polarization are orthogonal to each other;
   means for receiving the plurality of light beams separated by said double-refractive crystal prism; and
   means for converging the plurality of light beams obtained by said double-refractive crystal prism on said light receiving means as a plurality of light spots,
   wherein said double-refractive crystal prism is arranged such that the plurality of light spots are arranged on said light receiving means in a plurality of lines.

5. The plural-beam optical head according to claim 4, wherein said light receiving means reproduces recorded information from the optical information recording medium.

6. The plural-beam optical head according to claim 4, wherein said double-refractive crystal prism comprises a first triangular prism and a second triangular prism, and a virtual plane formed by the plurality of light beams incident on said double-refractive crystal prism forms an angle of substantially 45° with respect to a cemented surface formed between the first and second prisms and the normal of the cemented surface.

7. A method of separating light beams in a plural-beam optical head comprising the steps of:
   causing a plurality of light beams from an information recording medium to be incident on a double-refractive crystal prism;
   separating, with the double-refractive crystal prism, the plurality of light beams incident on the double-refractive crystal prism; and
   receiving the light beams separated by the double-refractive crystal prism by light receiving means,
   wherein the plurality of light beams separated by the double-refractive crystal prism is converged on the light receiving means as a plurality of light spots by converging means, and the double-refractive crystal prism is arranged such that the plurality of light spots are arranged on the light receiving means in a plurality of lines.

8. The method according to claim 7, wherein said separating step separates, with the double-refractive crystal prism, the plurality of light beams incident on the double-refractive crystal prism into components, the polarizing direction of which are orthogonal to each other.

9. The method according to claim 7, wherein said receiving step comprises the step of reproducing recorded information from the information recording medium.

10. The method according to claim 8, wherein said double-refractive crystal prism comprises a first triangular prism and a second triangular prism, and a virtual plane formed by the plurality of light beams incident on said double-refractive crystal prism forms an angle of substantially 45° with respect to a cemented surface formed between the first and second prisms and the normal of the cemented surface.

* * * * *

UNITED STATES PATENT AND TRADEMARK OFFICE
CERTIFICATE OF CORRECTION

PATENT NO.  : 5,434,841

DATED       : July 18, 1995

INVENTOR    : KOICHIRO NISHIKAWA

It is certified that errors appear in the above-identified patent and that said Letters Patent is hereby corrected as shown below:

<u>COLUMN 1</u>

Line 17, "a" should read --one--; and

Line 60, "Condensed" should read --condensed--.

<u>COLUMN 2</u>

Line 54, "problem that the" should read --the problem that--.

<u>COLUMN 3</u>

Line 62, "high" should read --light--.

<u>COLUMN 6</u>

Line 20, "direction" should read --directions--.

Signed and Sealed this

Fourteenth Day of November, 1995

Attest:

BRUCE LEHMAN

*Attesting Officer*   Commissioner of Patents and Trademarks